United States Patent [19]

Fisher

[11] Patent Number: 5,645,252
[45] Date of Patent: Jul. 8, 1997

[54] FASTENING DEVICE

[75] Inventor: John L. Fisher, Roscommon, Mich.

[73] Assignee: Goodwill Industries of Mid-Michigan, Inc., Flint, Mich.

[21] Appl. No.: 407,974

[22] Filed: Mar. 22, 1995

[51] Int. Cl.$^6$ ........................................... F16L 3/08
[52] U.S. Cl. .................................... 248/74.2; 24/297
[58] Field of Search ......................... 248/74.2, 68.1, 248/74.1; 24/297, 547

[56] References Cited

U.S. PATENT DOCUMENTS

| | | | |
|---|---|---|---|
| 3,606,218 | 9/1971 | Elund et al. | 248/74.2 |
| 4,083,523 | 4/1978 | Fisher | 248/74.2 |
| 4,369,946 | 1/1983 | Palmer et al. | 248/74.2 |
| 5,464,179 | 11/1995 | Ruckwardt | 248/68.1 |

*Primary Examiner*—Ramon O. Ramirez
*Attorney, Agent, or Firm*—Gifford, Krass, Groh, Sprinkle, Patmore, Anderson & Citkowski, P.C.

[57] ABSTRACT

A fastener for securing elongated objects in a centered and spaced apart arrangement includes a base and a bracket attached along one edge of the base and extending in an overhead manner above the base. The bracket includes a first overarm spring and a second inwardly extending leaf spring which are separated by a beveled entry nose portion proximate a front end of the base. An objected is press fitted between the nose portion and the base so as to be resiliently engaged by a finger portion of the leaf spring. A pair of protrusions extend from the finger portion in a direction facing the base and act upon the object or objects inserted to both center and space apart in a parallel fashion the objects.

7 Claims, 1 Drawing Sheet

FASTENING DEVICE

BACKGROUND OF THE INVENTION

1. Field of the Invention

The present invention relates generally to fastening devices and, more particularly, to an improved fastening device for retaining elongated objects of a broad range of different cross-sectional sizes such as wires, cables, tubes, rods and the like.

2. Description of the Prior Art

Numerous devices have been employed for holding and securing objects of elongated shape, such as wires, tubes, cables, rods and the like to a suitable support. The primary shortcoming of such devices is their ability to accommodate elongated objects of varying sizes and diameters.

U.S. Pat. No. 4,083,523, issued to Fisher, discloses a fastening device having a base and a resiliently mounted bracket which is deflected outwardly from the base upon the insertion of an elongated object. The resulting loading forces created by the deflection of the bracket secures the object between the bracket and the base. In a preferred embodiment, a plurality of identically configured fasteners are spaced at predetermined intervals so that a substantial length of conduit may be fixedly secured.

The shortcoming of the Fisher patent is that the object being retained tends to slide in a direction towards the tail end of the engaging portion of the fastener where the restraining forces exerted by the bracket are the weakest. An additional shortcoming of this device is the tendency of more than one object being retained within the fastener to bunch together again in a direction toward the tail end of the fastener, with a further resultant reduction in the restraining forces.

SUMMARY OF THE PRESENT INVENTION

The present invention is an improved fastening device for retaining one or more elongated objects in a centered and spaced relationship within the fastening device. The fastening device includes a base and a curved bracket which is secured along an edge of the base and extends over the base in an overhanging manner. The bracket includes an overarm spring and a leaf spring which extends from the overarm spring and which is biased in a direction toward the base. A pair of protrusions are formed on the surface of the leaf spring in a direction facing the surface of the base. The insertion of one or more elongated objects causes the leaf spring to deflect upwardly. The object or objects are then biased by the downward force of the leaf spring and overarm spring and are located in a both centered and spaced apart relationship from one another by engagement with the protrusions projecting from the leaf spring.

BRIEF DESCRIPTION OF THE DRAWING

A better understanding of the present invention will be had upon reference to the attached drawing, wherein like reference characters refer to like parts throughout the several views, and in which.

DETAILED DESCRIPTION OF THE PREFERRED EMBODIMENT

Figure 1:
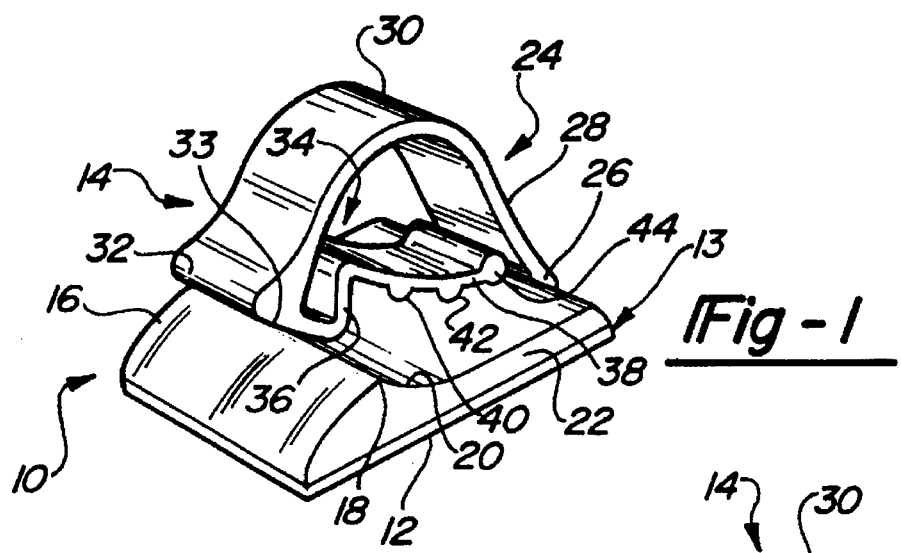
FIG. 1 is a perspective view of the fastening device of the present invention.

Referring to FIG. 1 a fastening device 10 according to the present invention is shown and is constructed of a resilient and durable plastic or other suitable material which provides resilient and durable springlike characteristics. The fastening device 10 includes a base 12 having a mass and a substantially flat bottom. A bracket 14 attaches at a rearward end 13 of the base 12 and extends overhead of the base. A more thorough description of the bracket 14 will be provided shortly.

The base 12 has an inclined planar surface 16 extending from a forward end 17 in a direction toward the rearward end 13. The inclined planar surface 16 terminates in an apex point 18. With reference again to FIG. 1, the inclined planar surface and apex point are uniform and both extend the width of the base. A downwardly sloping surface 20 extends rearwardly from the apex point and gradually assumes a substantially horizontal surface 22 which terminates at the rearward end 13 of the base.

Figure 2:
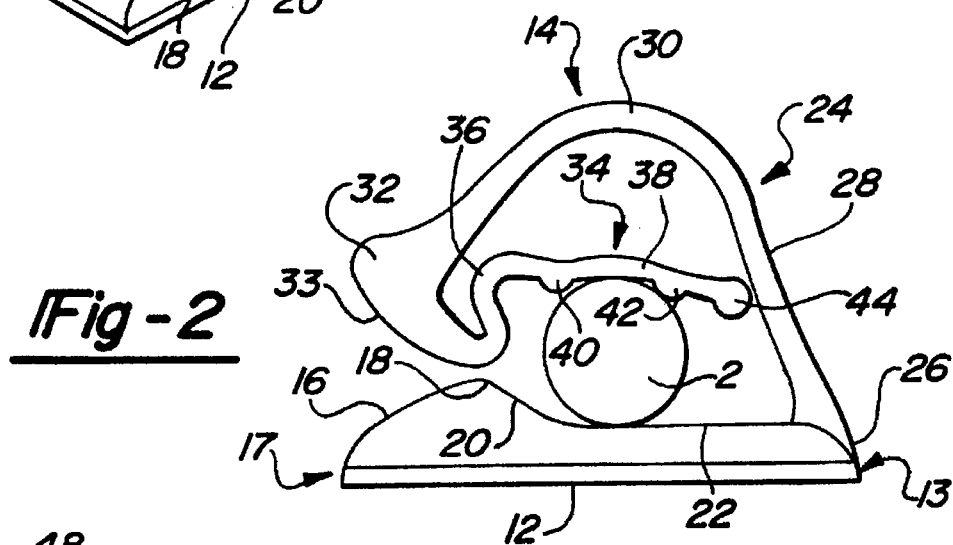
FIG. 2 is a side view of the fastening device similar to the view shown in FIG. 1 and illustrating a first arrangement for retaining a single elongated object.

Referring again to FIG. 1 and also to FIG. 2, the bracket 14 includes a overarm spring 24 which extends upwardly from a connection 26 at the rearward end 13 of the base 12. The overarm spring includes a upwardly and forwardly extending portion 28 which gradually turns into a curved portion 30 extending overhead of the base at a point proximate to the center of the base. The spring 24 then curves downwardly a predetermined distance so that it corresponds roughly to the substantial length of the base. The spring 24 forms a first springlike and resiliently biased member and, as seen in FIG. 1, is preferably narrower in length than the base for purposes which will be described later on.

The overarm spring 24 terminates in a relatively stiff beveled entry nose 32 located in proximity to the forward end of the base and at a predetermined spaced position above the inclined planar surface 16 of the base. The beveled entry nose 32 includes a downwardly curved lower surface 33 which corresponds to the inclined planar surface 16 of the base and which terminates a narrow distance short of contacting the base (See FIG. 2).

A leaf spring 34 extends in a rearward direction from the bevelled nose portion and includes a goose neck portion 36 and a finger member 38. The goose neck portion extends successively upwardly and rearwardly and the finger member, by virtue of its connection to the goose neck portion, is resiliently biased in a downward direction with the combined force of the overarm spring and leaf spring.

Figure 3:
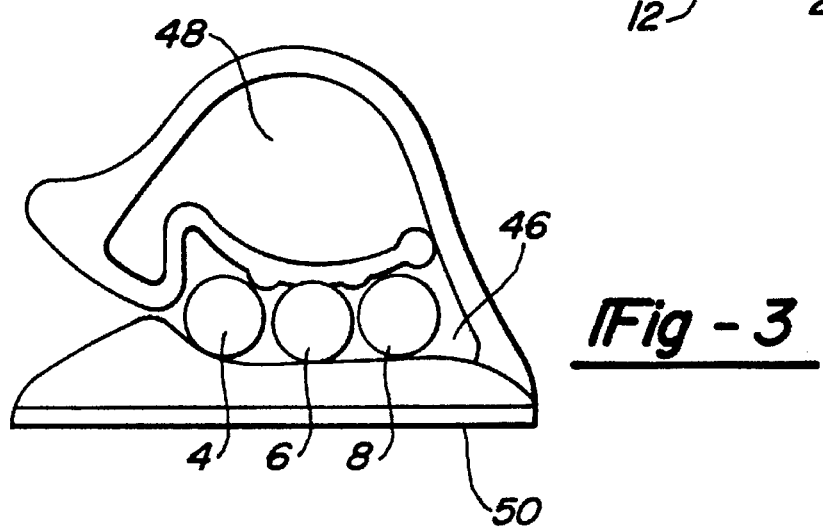
FIG. 3 is a side view of the fastening device similar to that shown in FIG. 2 and illustrating a second arrangement for retaining a plurality of elongated objects.

A first protrusion or bump portion 40 projects from an underside of the finger member 38 and a second protrusion or bump portion 42 also projects from the underside of the finger member 38 a predetermined distance from the first protrusion 40. The first and second protrusions are arranged opposite the substantially horizontal surface of the base and are biased in a direction towards the base by virtue of the downwardly resilient biasing means of the overarm spring and leaf spring of the bracket. The finger terminates in a rounded tip portion 44 which is in close proximity to the upwardly and forwardly extending portion of the overarm spring and which enables the finger member of the leaf spring to be upwardly deflected for receiving the elongated object. As is further seen from FIG. 3, the upward deflection of the finger member results in a first cavity 46 being established between the base and the finger portion and a second cavity 48 being established between the finger portion and the overarm spring. As was also previously described, the bracket is constructed somewhat narrower than the base to reduce the amount of material necessary for constructing the fastener and to also reflect the necessary amount of resilient forces required by the bracket for holding the elongated objects in place.

Referring again to FIG. 2, an elongated object 2 (shown in cross section) is positioned proximate to the beveled nose entry point of the bracket and the inclined planar surface of the base. The object 2 is then pressed against the fastener so that the nose 32 deflects upwardly and away from the base to thereby increase the area between the base and bracket and to allow the object to pass therethrough. Following insertion of the object, the overarm spring and leaf spring in turn exert an opposite and downward biasing force to resiliently engage the elongated object and the spaced protrusions on the finger portion both resiliently locate and center the object towards the middle of the fastener.

A major advantage of the centering and locating protrusions is to position the object inserted into the fastener towards a central portion of the fastener where the biasing forces exerted on the object are the greatest. The central positioning of the object between the spaced protrusions also results in the holding forces being exerted equally by the resilient clamping means throughout the finger portion so that the object is securely held and will not tend to slide towards the rear end of the fastener where the resilient holding forces are not so great.

Referring again to FIG. 3, a second resiliently engaging arrangement made possible by the fastener of the present invention is thereshown. Specifically, a group of elongated objects 4, 6 and 8 are held at equally spaced intervals along the length of the fastener by the spaced apart protrusions. The advantage of such an arrangement is to prevent the objects from becoming bunched together, particularly when it is desirable to employ spaced fasteners to secure longer lengths of tube or conduit in a spaced apart fashion. The arrangement of FIG. 3 also distributes equally the clamping and restraining forces exerted by the bracket against the objects and centers the objects within the fastener to the extent possible.

An adhesive strip of material 50 is preferably applied to the bottom of the base to permit the base to be mounted to a flat surface. Other fastening means however can be just as easily employed to mount the fastener and a plurality of identical fasteners can be mounted in a parallel fashion and at spaced intervals to hold longer lengths of the elongated objects. While only one fastener is shown in detail, it is evident that a plurality of fasteners can be employed in the manner described.

Having described my invention, other embodiments will become apparent to those skilled in the art to which it pertains without deviating from the scope of the appended claims.

I claim:

1. A fastening device for retaining elongated objects, said fastening device comprising:

a base;

a bracket secured to an edge of said base and extending from said base in an overhanging manner;

said bracket including clamping means for engaging at least one elongated object and for urging the elongated object into contact against said base; and said clamping means further comprising centering means for locating and for retaining the elongated object at a centered location between said base and said bracket;

said centering means comprising at least two protrusions extending toward said base with one of said protrusions disposed on each side of said elongated object to position said elongated object within said clamping means.

2. The fastening device as described in claim 1 and including said protrusions forming a location for a second and a third elongated member to be clamped to said fastening device by said clamping means.

3. The fastening device as described in claim 1, said bracket comprising:

an overarm spring extending from said edge of said base at a rear end of said base, said overarm spring having a substantially semicircular shape and extending in an overhead manner above said base;

said overarm spring terminating in a beveled nose portion located overhead and in proximity to a front end of said base;

a goose neck portion extending successively inwardly and upwardly from said beveled nose portion; and a curved finger portion extending rearwardly from said goose neck portion within a cavity formed between said overarm spring and said base, said finger portion terminating in a rounded tip portion adjacent said overarm spring.

4. The fastening device as described in claim 1, said base comprising:

a body having a mass and a substantially flat bottom;

an upwardly inclined planar surface extending from said front end of said base opposite said beveled nose portion of said bracket;

said inclined surface terminating at an apex in close proximity to said goose neck portion, a relatively narrow channel being established between said apex and said goose neck portion; and a downwardly sloping surface extending from said apex towards said rear end of said base, said surface terminating in a substantially horizontal surface opposite said finger portion of said bracket.

5. The fastening device as described in claim 4, said bracket is constructed of a resilient material such that said bracket is deflected upwardly upon insertion of the elongated object between said beveled nose portion and said inclined planar surface of said base, said finger portion exerting a downward loading force on the elongated object so that the object biases against said substantially horizontal surface.

6. The fastening device as described in claim 4, further comprising securing means for attaching said substantially flat bottom of said base to a mounting surface.

7. The fastening device as described in claim 6, said securing means comprising an adhesive strip secured to an underside of said bottom.

* * * * *